United States Patent
Mueller et al.

(10) Patent No.: US 10,782,222 B2
(45) Date of Patent: Sep. 22, 2020

(54) DIESEL PARTICULATE SENSOR

(71) Applicant: Bayerische Motoren Werke Aktiengesellschaft, Munich (DE)

(72) Inventors: Bernhard Mueller, Buchloe (DE); Rudolf Held, Baierbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/876,265

(22) Filed: Jan. 22, 2018

(65) Prior Publication Data

US 2018/0143122 A1 May 24, 2018

Related U.S. Application Data

(63) Continuation of application No. PCT/EP2016/074449, filed on Oct. 12, 2016.

(30) Foreign Application Priority Data

Oct. 20, 2015 (DE) .................. 10 2015 220 395

(51) Int. Cl.
*G01N 15/06* (2006.01)
*F02D 41/14* (2006.01)
*F02D 41/22* (2006.01)
*G01N 27/04* (2006.01)
*G01N 15/00* (2006.01)

(52) U.S. Cl.
CPC ..... *G01N 15/0656* (2013.01); *F02D 41/1466* (2013.01); *F02D 41/222* (2013.01); *G01N 15/0618* (2013.01); *G01N 27/04* (2013.01); *B01D 2255/30* (2013.01); *F01N 2330/06* (2013.01); *F01N 2330/10* (2013.01); *F01N 2560/05* (2013.01); *G01N 2015/0046* (2013.01)

(58) Field of Classification Search
CPC ........... G01N 15/0656; G01N 15/0618; G01N 27/04; G01N 15/0606; G01N 2015/0046; F02D 41/1466; F02D 41/222; F01N 2560/05; F01N 2330/06; B01D 2255/30
See application file for complete search history.

(56) References Cited

U.S. PATENT DOCUMENTS

2008/0142148 A1  6/2008  Nielsen et al.
2008/0190173 A1  8/2008  Wienand et al.
(Continued)

FOREIGN PATENT DOCUMENTS

CN  101103478 A  1/2008
CN  101163962 A  4/2008
(Continued)

OTHER PUBLICATIONS

Wang et al., "Preparation and thermal stability of zirconia-doped mullite fibers via sol-gel method", 2011, Progress in Natural Science: Materials International 21, pp. 117-121 (Year: 2011).*

(Continued)

*Primary Examiner* — David Z Huang
(74) *Attorney, Agent, or Firm* — Crowell & Moring LLP

(57) ABSTRACT

A soot particulate sensor has a ceramic support made from an aluminum silicate, which is provided with a conductor path made of an intermetallic compound.

10 Claims, 1 Drawing Sheet

(56) References Cited

U.S. PATENT DOCUMENTS

| 2012/0231154 A1* | 9/2012 | Liao | H05K 3/1258 |
| | | | 427/97.4 |
| 2015/0020576 A1* | 1/2015 | Lee | G01N 15/0656 |
| | | | 73/28.02 |
| 2015/0152013 A1 | 6/2015 | Liu et al. | |

FOREIGN PATENT DOCUMENTS

| CN | 101381225 A | 3/2009 |
| CN | 101505847 A | 8/2009 |
| CN | 102757229 A | 10/2012 |
| CN | 103304227 A | 9/2013 |
| CN | 103566774 A | 2/2014 |
| DE | 101 33 384 A1 | 1/2003 |
| EP | 2 120 044 A1 | 11/2009 |
| EP | 3 093 648 A1 | 11/2016 |
| EP | 3 187 863 A1 | 7/2017 |
| WO | WO 2006/111386 A1 | 10/2006 |
| WO | WO 2008/021587 A2 | 2/2008 |
| WO | WO 2015/105182 A1 | 7/2015 |

OTHER PUBLICATIONS

German-language Search Report issued in counterpart German Application No. 10 2015 220 395.6 dated Jul. 15, 2016 with partial English translation (11 pages).

International Search Report (PCT/ISA/210) issued in PCT Application No. PCT/EP2016/074449 dated Jan. 16, 2017 with English translation (5 pages).

German-language Written Opinion (PCT/ISA/237) issued in PCT Application No. PCT/EP2016/074449 dated Jan. 16, 2017 (5 pages).

Chinese-language Office Action issued in counterpart Chinese Application No. 201680040692.X dated Aug. 6, 2019 with English translation (13 pages).

German-language European Office Action issued in counterpart European Application No. 16781405.2 dated Jan. 21, 2019 (four (4) pages).

Chinese-language Office Action issued in Chinese Application No. 201680040692.X dated Feb. 25, 2020 with English translation (nine (9) pages).

* cited by examiner

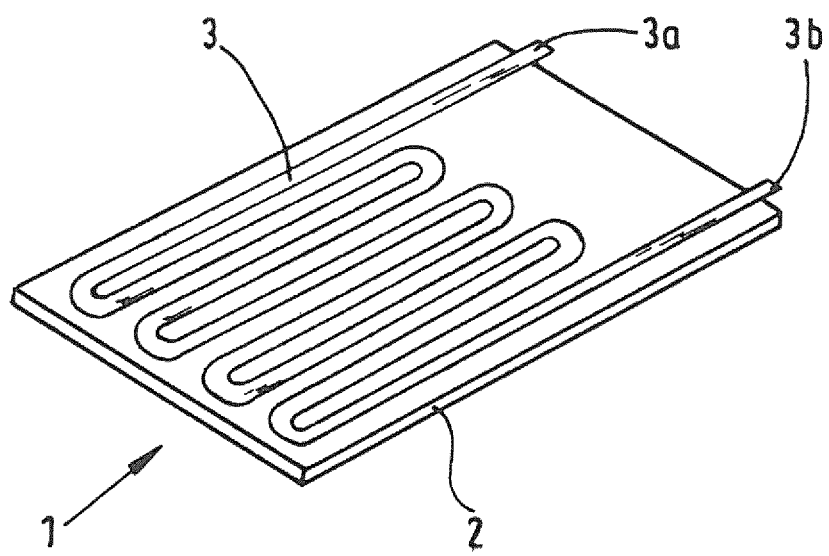

DIESEL PARTICULATE SENSOR

CROSS REFERENCE TO RELATED APPLICATIONS

This application is a continuation of PCT International Application No. PCT/EP2016/074449, filed Oct. 12, 2016, which claims priority under 35 U.S.C. § 119 from German Patent Application No. 10 2015 220 395.6, filed Oct. 20, 2015, the entire disclosures of which are herein expressly incorporated by reference.

BACKGROUND AND SUMMARY OF THE INVENTION

The invention relates to a soot particle sensor (also known as an exhaust or diesel particulate sensor) having a ceramic support on which there is arranged at least one conductor track which has parallel sections arranged at a distance from one another and the ends of which are connected to electronics for determining the electrical resistance of the conductor track, and a process for the production thereof.

Such a soot particle sensor is known (WO 2006/111386 A1). In the known sensor, the conductor track is made of platinum, while the sensor in the case of the commercially available sensors of this type consists of zirconium dioxide. However, both platinum and zirconium dioxide are expensive.

It is an object of the invention to provide an inexpensive soot particle sensor which, in terms of its measurement accuracy, at least corresponds to the abovementioned sensor made of platinum and zirconium dioxide.

This and other objects are achieved according to the invention by a soot particle sensor and a process of producing same, having a ceramic support on which there is arranged at least one conductor track which has parallel sections arranged at a distance from one another and the ends of which are connected to electronics for determining the electrical resistance of the conductor track. The ceramic support is made of an aluminum silicate and the conductor track is made of an intermetallic compound.

The soot particle sensor of the invention has at least one conductor track which has parallel sections arranged at a distance from one another and is arranged on a ceramic support and the ends of which are connected to electronics for determining the electrical resistance of the conductor track. Since the resistance of the conductor track is decreased by soot particles which bridge neighboring conductor track sections, the sensor is suitable for measuring soot in exhaust gases, in particular in the exhaust gases from internal combustion engines, especially diesel engines.

The parallel sections of the at least one conductor track are for this purpose arranged at a distance from one another which corresponds to the size of the soot particles to be detected.

The conductor track preferably has a meandering or loop-like shape. The support preferably has a plate-like shape.

The sensor of the invention can be arranged in the exhaust gas channel of the internal combustion engine, preferably downstream of the particulates filter, with the exhaust gas preferably flowing perpendicular to and over the full area of the face of the plate-shaped support provided with the conductor track.

The ceramic support of the soot particle sensor of the invention consists essentially, i.e. preferably to an extent of at least 80% by weight, of an aluminum silicate. As aluminum silicate, preference is given to using an island silicate, i.e. a silicate whose silicate ions consist of isolated $SiO_4$ tetrahedra, i.e. $SiO_4$ tetrahedra which are not joined to one another by Si—O—Si bonds.

As aluminum island silicate, use is made in particular of mullite and/or silimanite, which largely corresponds to mullite chemically and in all properties.

Mullite has substantially the same E modulus and resistance at 600° C. and also the same maximum use temperature of 1650° K as zirconium dioxide, which is used as support material in the commercial soot particle sensors. Mullite as support material can be admixed with reinforcing fibers, in particular mullite fibers, or be doped with zirconium dioxide in order to form a support having excellent mechanical properties, in particular a high bending strength.

The conductor track of the soot particle sensor of the invention consists essentially, i.e. to an extent of at least 80% by weight, of an intermetallic compound, i.e. a chemical compound composed of at least two metals, with a metal here also being able to be a semimetal such as silicon. In contrast to alloys, intermetallic compounds are characterized by lattice structures.

The intermetallic compound is preferably molybdenum disilicide and/or an aluminide, in particular titanium aluminide such as $Ti_3Al$ or TiAl or iron aluminide such as $Fe_{75}Al_{25}$ or $Fe_{50}Al_{50}$. Intermetallic compounds are notable not only for their high melting point and their high strength but also especially for their high melting point and their high electrical conductance [A/(Vm)]. Thus, for example, molybdenum disilicide has a melting point of 2303° K which is higher than that of platinum and a high conductance of $4.63 \times 10^6$ A/(Vm).

Aluminum silicates, including mullite, are associated with low costs. $MoSi_2$ can, for example, be prepared by reaction of molybdenum and silicon at high temperature. Intermetallic compounds can also be produced inexpensively, in particular iron aluminide.

The ceramic support of the soot particle sensor of the invention is preferably produced by tape casting and sintering. Here, the aluminum silicate, i.e., for example, mullite, is used as powder having a particle size of not more than 20 μm, preferably not more than 5 μm.

The powder is mixed with a commercial plasticizer for tape casting, for example a carboxylic ester preparation, a binder for tape casting, e.g. polyvinyl butyral, and/or a dispersant, e.g. alkyl phosphate, whereupon a sheet is produced from the pourable composition on a tape casting plant using a doctor blade and this sheet is subjected to drying. The supports are produced as green bodies from the flexible dried sheet, e.g. by stamping.

The intermetallic compound, i.e., for example, molybdenum disilicide, is used as powder having a maximum particle size of not more than 20 μm, in particular not more than 5 μm. The powder is dispersed in an organic solvent, e.g. an alcohol, in order to form a printable suspension. The dried green body consisting of, for example, mullite is printed with a printed pattern corresponding to the at least one conductor track with which the support is to be provided using the suspension containing the intermetallic compound, i.e., for example, molybdenum disilicide, for example by screen printing.

The printed green body is subsequently sintered in order to form the ceramic support from the green body with the sintered conductor track from the printed pattern.

The conductor track which is applied by screen printing has a width of at least 30 μm, in particular from 30 to 300 μm. If the intermetallic compound, i.e., for example, molybdenum disilicide, is applied as paste to the support, the width of the conductor track is at least about 100 μm. The distance between neighboring conductor track sections can likewise be, for example, from 30 to 300 μm. Thus, even small soot particles down to a particle size of, for example, 30 μm can be detected reliably.

The minimum width of the conductor track represents the limit of the processability in printing or screen printing. It thus determines the number of meandering sections which can be applied to a support having a given area.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE schematically illustrates a soot particle sensor according to an embodiment of the invention.

DETAILED DESCRIPTION OF THE DRAWING

In the FIGURE, the soot particle sensor 1 has a plate-shaped ceramic support 2, for example composed of mullite, which is provided with a meandering conductor track 3, e.g. composed of molybdenum disilicide, whose ends 3a and 3b are connected to electronics (not shown) for determining the electrical resistance of the conductor track 3. The more soot particles, i.e. electrically conductive carbon particles, that bridge the parallel sections of the meandering conductor track 2, the greater is the reduction in the resistance of the conductor track 2, as a result of which the decrease in the resistance represents a measure for the soot loading of the sensor 1.

In the FIGURE, the conductor track 3 is depicted as being broad in the interests of clarity. However, in actual fact it has a width of only, for example, from 30 to 300 μm. The distance between neighboring meandering sections is also of this order of magnitude.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A soot particle sensor, comprising:
a ceramic support on which there is arranged at least one conductor track which has parallel sections arranged at a distance from one another, ends of which are connected to electronics for determining electrical resistance of the conductor track, wherein
the ceramic support is made of an aluminum silicate and the conductor track is made of an intermetallic compound,
the ceramic support contains ceramic reinforcing fiber,
the ceramic reinforcing fibers are formed by mullite fibers, and
the aluminium silicate is dope with zirconium dioxide.

2. The soot particle sensor as claimed in claim 1, wherein the aluminum silicate is an island silicate.

3. The soot particle sensor as claimed in claim 2, wherein the island silicate is mullite.

4. The soot particle sensor as claimed in claim 2, wherein the ceramic support contains ceramic reinforcing fibers.

5. The soot particle sensor as claimed in claim 1, wherein the ceramic support contains ceramic reinforcing fibers.

6. The soot particle sensor as claimed in claim 1, wherein the intermetallic compound is molybdenum disilicide and/or an aluminide.

7. The soot particle sensor as claimed in claim 6, wherein the aluminide is titanium aluminide and/or iron aluminide.

8. A process for producing a soot particle sensor comprising a ceramic support on which there is arranged at least one conductor track which has parallel sections arranged at a distance from one another and the ends of which are connected to electronics for determining the electrical resistance of the conductor track, wherein
the ceramic support is made of an aluminum silicate and the conductor track is made of an intermetallic compound,
the ceramic support is formed by tape casting and sintering, and
the ceramic support contains ceramic reinforcing fibers,
the ceramic reinforcing fibers are formed by mullite fibers, and
the aluminum silicate is doped with zirconium dioxide.

9. The process as claimed in claim 8, wherein
a sheet formed by tape casting is dried after casting, at least one dried support is printed as green body with a printed pattern corresponding to the conductor track using a suspension containing the intermetallic compound in powder form and the printed sheet is sintered in order to form, by sintering of the printed pattern and sintering of the green body, the ceramic support provided with the sintered conductor track.

10. The process as claimed in claim 9, wherein
the dried green body is printed with the suspension containing the intermetallic compound in powder form by screen printing.

* * * * *